US009418698B2

(12) United States Patent  
Blinick et al.

(10) Patent No.: US 9,418,698 B2  
(45) Date of Patent: *Aug. 16, 2016

(54) DYNAMIC GAIN CONTROL FOR USE WITH ADAPTIVE EQUALIZERS

(71) Applicant: International Business Machines Corporation, Armonk, NY (US)

(72) Inventors: Katherine T. Blinick, Tempe, AZ (US); Robert A. Hutchins, Tucson, AZ (US); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/957,540

(22) Filed: Dec. 2, 2015

(65) Prior Publication Data

US 2016/0093326 A1 Mar. 31, 2016

Related U.S. Application Data

(63) Continuation of application No. 14/334,474, filed on Jul. 17, 2014, now Pat. No. 9,236,084.

(51) Int. Cl.
*G11B 5/09* (2006.01)
*G11B 20/10* (2006.01)
*G11B 5/035* (2006.01)
*G11B 5/008* (2006.01)

(52) U.S. Cl.
CPC ...... *G11B 20/10055* (2013.01); *G11B 5/00813* (2013.01); *G11B 5/035* (2013.01); *G11B 5/09* (2013.01); *G11B 20/10037* (2013.01); *G11B 20/10046* (2013.01)

(58) Field of Classification Search
None
See application file for complete search history.

(56) References Cited

U.S. PATENT DOCUMENTS

| 3,764,914 A | 10/1973 | Karnaugh |
| 5,548,642 A | 8/1996 | Diethorn |
| 5,596,605 A | 1/1997 | Kiyanagi et al. |
| 6,052,404 A | 4/2000 | Tiepermann |

(Continued)

FOREIGN PATENT DOCUMENTS

| EP | 0805447 A2 | 11/1997 |
| EP | 1560329 A1 | 8/2005 |

(Continued)

OTHER PUBLICATIONS

Supplemental Notice of Allowance from U.S. Appl. No. 14/334,474, dated Nov. 25, 2015.

(Continued)

*Primary Examiner* — Peter Vincent Agustin
(74) *Attorney, Agent, or Firm* — Zilka-Kotab, PC

(57) ABSTRACT

According to one embodiment, a magnetic tape drive includes a controller configured to direct first data through a first finite impulse response (FIR) gain module in response to a determination that the first data is being read from a magnetic tape medium in an asynchronous mode to control FIR gain of the first data. The controller is also configured to direct second data through a second FIR gain module in response to a determination that the second data is being read from the magnetic tape medium in a synchronous mode to control FIR gain of the second data. A FIR gain value of the second FIR gain module is automatically controlled. Other systems for dynamic gain control with adaptive equalizers are described according to more embodiments.

20 Claims, 12 Drawing Sheets

(56) References Cited

U.S. PATENT DOCUMENTS

| | | | |
|---|---|---|---|
| 6,167,415 | A | 12/2000 | Fischer et al. |
| 6,175,849 | B1 | 1/2001 | Smith |
| 6,208,481 | B1 | 3/2001 | Spurbeck et al. |
| 6,636,562 | B1 | 10/2003 | Galbraith et al. |
| 6,650,756 | B1 | 11/2003 | Saito et al. |
| 6,721,368 | B1 | 4/2004 | Younis et al. |
| 6,804,695 | B1 | 10/2004 | Hsu |
| 7,271,971 | B2 | 9/2007 | Hutchins et al. |
| 7,359,135 | B2 | 4/2008 | Hutchins et al. |
| 7,424,053 | B2 | 9/2008 | Murray et al. |
| 7,436,615 | B2 | 10/2008 | Eleftheriou et al. |
| 7,589,927 | B2 | 9/2009 | Hutchins et al. |
| 7,596,176 | B2 | 9/2009 | Eleftheriou et al. |
| 7,821,733 | B2 | 10/2010 | Eleftheriou et al. |
| 8,164,846 | B1 | 4/2012 | Yang et al. |
| 8,548,072 | B1 | 10/2013 | Eliaz |
| 8,605,380 | B1 | 12/2013 | Christensen et al. |
| 8,625,226 | B2 | 1/2014 | Christensen et al. |
| 8,665,941 | B1 | 3/2014 | Eliaz |
| 8,947,821 | B1 | 2/2015 | Blinick et al. |
| 9,236,084 | B1 * | 1/2016 | Blinick ................ G11B 5/035 |
| 9,324,364 | B2 | 4/2016 | Hutchins |
| 2002/0141105 | A1 | 10/2002 | Ellis |
| 2003/0099289 | A1 | 5/2003 | Birru |
| 2003/0219085 | A1 | 11/2003 | Endres et al. |
| 2004/0105514 | A1 | 6/2004 | Howarth et al. |
| 2004/0165303 | A1 | 8/2004 | Wu et al. |
| 2005/0163251 | A1 | 7/2005 | McCallister |
| 2005/0261898 | A1 | 11/2005 | Van Klinken |
| 2005/0281231 | A1 | 12/2005 | Kwon et al. |
| 2006/0082915 | A1 | 4/2006 | Eleftheriou et al. |
| 2008/0112289 | A1 | 5/2008 | Nishimura et al. |
| 2009/0063940 | A1 | 3/2009 | Yen et al. |
| 2010/0176865 | A1 | 7/2010 | Dahle et al. |
| 2010/0177419 | A1 | 7/2010 | Liu et al. |
| 2010/0189207 | A1 | 7/2010 | Jibry |
| 2010/0220780 | A1 | 9/2010 | Peng et al. |
| 2011/0298890 | A1 | 12/2011 | Bacche |
| 2013/0051211 | A1 | 2/2013 | Bailey et al. |
| 2013/0097213 | A1 | 4/2013 | Liao et al. |
| 2013/0259111 | A1 | 10/2013 | Harman |
| 2014/0092952 | A1 | 4/2014 | Aguilar-Arreola et al. |
| 2014/0105268 | A1 | 4/2014 | Eliaz |
| 2014/0212132 | A1 | 7/2014 | Saito et al. |
| 2014/0241477 | A1 | 8/2014 | Eliaz |
| 2016/0019929 | A1 | 1/2016 | Hutchins |
| 2016/0019930 | A1 * | 1/2016 | Blinick ................ G11B 5/09 360/65 |
| 2016/0093325 | A1 | 3/2016 | Blinick et al. |

FOREIGN PATENT DOCUMENTS

| | | |
|---|---|---|
| EP | 002075924 A1 | 7/2009 |
| FR | 2799085 A1 | 3/2001 |
| JP | S59141842 A | 8/1984 |
| JP | 2001044830 A | 2/2001 |
| WO | 03034673 A2 | 4/2003 |
| WO | 2005033904 A2 | 4/2005 |
| WO | 2006116723 A2 | 11/2006 |

OTHER PUBLICATIONS

Blinick et al., U.S. Appl. No. 14/957,533, filed Dec. 2, 2015.
List of IBM Patents or Patent Applications Treated As Related.
Du et al., "A Linearly Constrained Adaptive FIR Filter for Hard Disk Drive Read Channels," 1997 IEEE, pp. 1613-1617.
Saha et al., "Adaptive Particle Swami Optimization for Low Pass Finite Impulse Response Filter Design," International conference on Communication and Signal Processing, Apr. 3-5, 2013, pp. 19-23.
Sobey et al., "LMS Filter Adaptation in PRML Channels," ChannelScience.com, pp. 1-8.
Xie et al., "Implementation-Friendly Constraint for Adaptive Finite Impulse Response Filters for Equalization," IEEE Transactions on Magnetics, vol. 44, No. 2, Feb. 2008, pp. 315-319.
Eleftheriou et al., "Adaptive noise-predictive maximum-likelihood (NPML) data detection for magnetic tape storage systems," IBM J. Res. & Dev., vol. 54, No. 2, Paper 7, Mar./Apr. 2010, pp. 1-10.
Non-Final Office Action from U.S. Appl. No. 14/334,440, dated Jun. 17, 2015.
Notice of Allowance from U.S. Appl. No. 14/334,474, dated May 11, 2015.
Hutchins, U.S. Appl. No. 14/334,440, filed Jul. 17, 2014.
Blinick et al., U.S. Appl. No. 14/334,474, filed Jul. 17, 2014.
Notice of Allowance from U.S. Appl. No. 14/334,474, dated Sep. 2, 2015.
Statement of Relevance of Non-Translated Foreign Document JP2001044830A.
Statement of Relevance of Non-Translated Foreign Document JPS59141842.
Non-Final Office Action from U.S. Appl. No. 14/334,440, dated Oct. 19, 2015.
Notice of Allowance from U.S. Appl. No. 14/334,440, dated Jan. 29, 2016.
Supplemental Notice of Allowance from U.S. Appl. No. 14/334,440, dated Feb. 29, 2016.
Hutchins, R., U.S. Appl. No. 15/087,836, filed Mar. 31, 2016.

* cited by examiner

DYNAMIC GAIN CONTROL FOR USE WITH ADAPTIVE EQUALIZERS

BACKGROUND

The present invention relates to data storage and retrieval, and more particularly, to dynamic gain control used with adaptive equalizers in a read channel for reading data from a data storage medium.

In magnetic data storage, and particularly when storing data to and retrieving data from magnetic tape, a given tape drive, in order to be most useful, should be able to read as many different types of magnetic tapes as possible, from multiple vendors and having different layouts. The magnetic tapes that are read may be manufactured by any of several different manufacturers. Furthermore, legacy magnetic tapes having outdated formats and layouts should also be able to be read by the tape drive. Because of this, the read-detection channel of the tape drive should be able to adapt to variations in readback signals that it might receive, across a family of magnetic tapes having different manufacturers and/or layouts.

Thus, it is desirable that the read-detection channel has the ability to adapt to a wide range of signals while ensuring that the adaptation is controlled and optimal.

SUMMARY

According to one embodiment, a magnetic tape drive includes a controller configured to direct data through either a first finite impulse response (FIR) gain module or a second FIR gain module to control FIR gain of the data. The first FIR gain module is utilized when reading data from a magnetic tape medium in an asynchronous mode, and the second FIR gain module is utilized when reading data from the magnetic tape medium in a synchronous mode and a FIR gain value of the second FIR gain module is automatically controlled.

In another embodiment, a magnetic tape drive includes a controller configured to direct first data through a first FIR gain module in response to a determination that the first data is being read from a magnetic tape medium in an asynchronous mode to control FIR gain of the first data. The controller is also configured to direct second data through a second FIR gain module in response to a determination that the second data is being read from the magnetic tape medium in a synchronous mode to control FIR gain of the second data. A FIR gain value of the second FIR gain module is automatically controlled.

According to another embodiment, a magnetic tape drive includes a controller configured to direct data through either a first FIR gain module or a second FIR gain module to control FIR gain of the data depending on a mode used to read the data from a magnetic tape medium. The first FIR gain module is utilized when reading the data from the magnetic tape medium in an asynchronous mode, and the second FIR gain module is utilized when reading the data from the magnetic tape medium in a synchronous mode.

Other aspects and embodiments of the present invention will become apparent from the following detailed description, which, when taken in conjunction with the drawings, illustrates by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified.

In one embodiment, dynamic gain control is provided for use with a decoupled least-means square (LMS) equalization loop architecture in a read channel for reading data from a magnetic storage medium.

According to one general embodiment, a system for processing data includes a controller configured to: receive data read from a magnetic storage medium, apply a finite impulse response (FIR) filter to the data to obtain equalized data, and direct the equalized data through either a first FIR gain module or a second FIR gain module to control FIR gain of the equalized data, wherein the first FIR gain module is utilized when reading data in an asynchronous mode, and wherein the second FIR gain module is utilized when reading data in a synchronous mode and a FIR gain value of the second FIR gain module is automatically controlled.

In another general embodiment, a method for processing data in a read channel includes receiving data read from a magnetic storage medium, passing the data through an equalizer which applies a FIR filter to the data to obtain equalized data, and passing the equalized data through either a first FIR gain module or a second FIR gain module to control FIR gain of the equalized data, wherein the first FIR gain module is utilized when reading data in an asynchronous mode, and wherein the second FIR gain module is utilized when reading data in a synchronous mode and a FIR gain value of the second FIR gain module is automatically controlled.

According to another general embodiment, a magnetic tape drive includes a controller configured to read data from a magnetic tape, pass the data through an equalizer which applies a FIR filter to the data to obtain equalized data, and pass the equalized data through either a first FIR gain module or a second FIR gain module to control FIR gain of the equalized data, wherein the first FIR gain module is utilized when reading data in an asynchronous mode, and wherein the second FIR gain module is utilized when reading data in a synchronous mode and a FIR gain value of the second FIR gain module is automatically controlled.

Figure 1A:
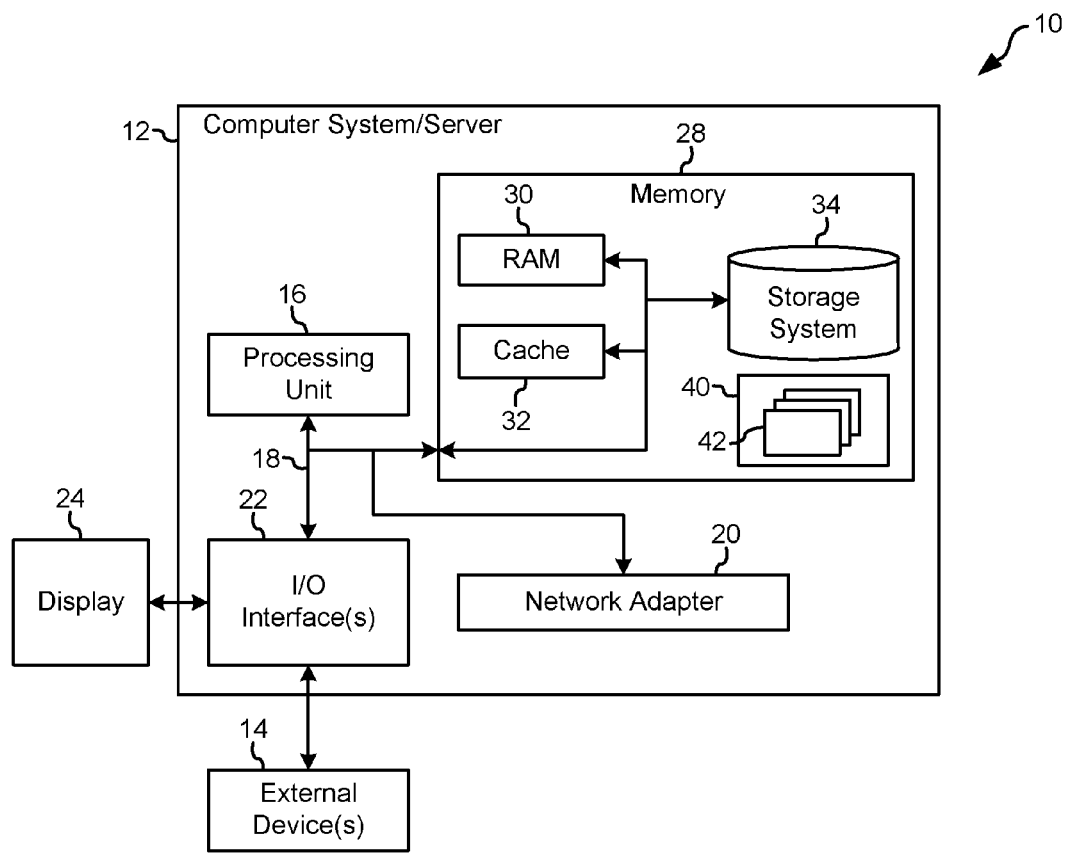
FIG. 1A illustrates a network storage system, according to one embodiment.

Referring now to FIG. 1A, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
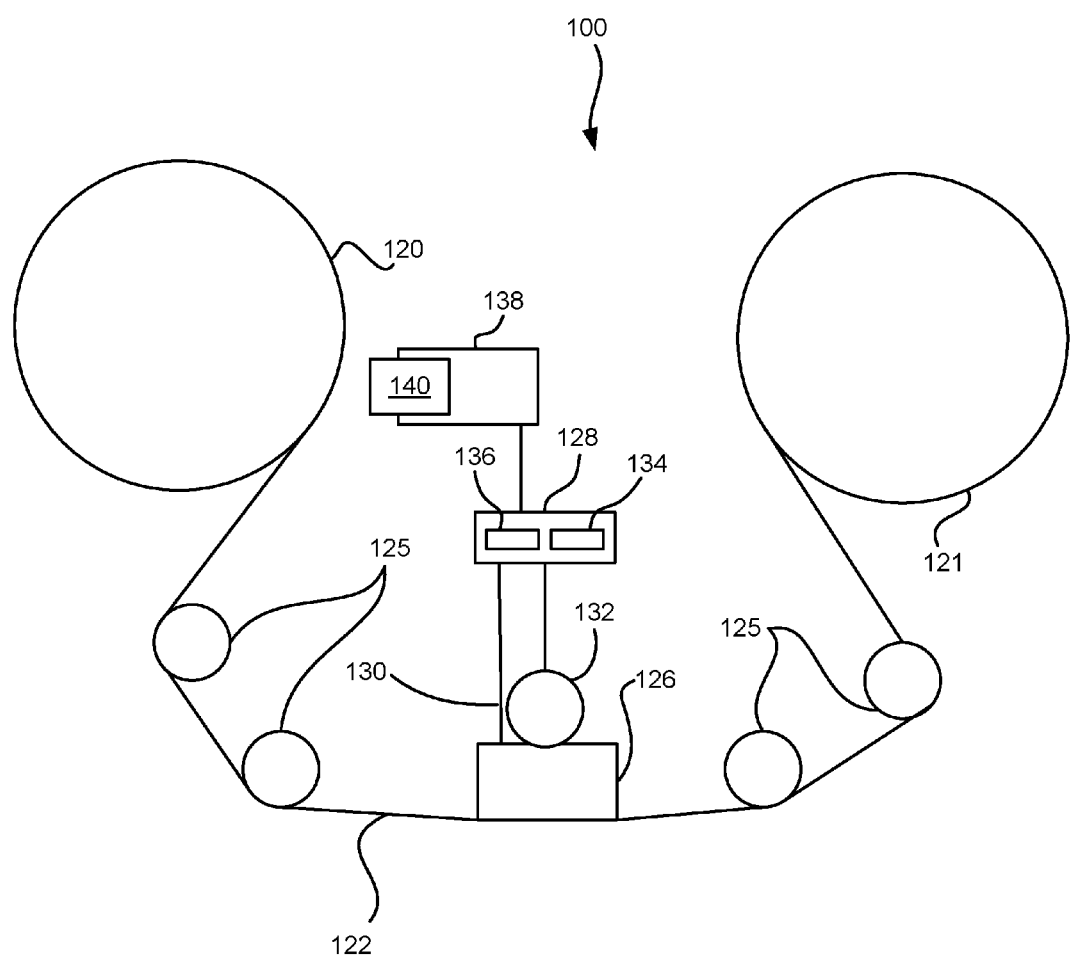
FIG. 1B illustrates a simplified tape drive of a tape-based data storage system, according to one embodiment.

FIG. 1B illustrates a simplified tape drive 100 of a tape-based data storage system, which may be employed according to various embodiments. While one specific implementation of a tape drive is shown in FIG. 1B, it should be noted that the embodiments described herein may be implemented in the context of any type of tape drive system. As shown, a tape supply cartridge 120 and a take-up reel 121 are provided to support a tape 122. One or more of the reels may form part of a removable cassette and are not necessarily part of the tape drive 100. The tape drive 100, such as that illustrated in FIG. 1B, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

In one embodiment, the tape drive 100 may comprise a data buffer 138 which is accessible by the tape drive 100 and the controller 128. This data buffer 138 may be organized as a ring buffer and may be split into one or more portions, with one portion being a reserved data buffer 140, which may also be organized into a ring buffer, to be used for storage of partial data sets during reading operations from the tape 122.

An interface may also be provided for communication between the tape drive 100 and a host (integral or external) to send and receive the data and for controlling the operation of the tape drive 100 and communicating the status of the tape drive 100 to the host, as would be understood by one of skill in the art.

In order to achieve high adaptability, there are many different adaptive loops included in typical magnetic tape drives: a least means square (LMS) adaptive equalization loop, an asymmetry compensation loop, a gain control loop, a data dependent noise-predictive maximum likelihood (DD-NPML) parameter loop, etc. These loops adapt specific parameters to provide stable response under a wide range of conditions. Unfortunately, some of these loops may be fully contained within other loops or may be partially contained within other loops. When this loop overlap occurs, there may be interaction between the overlapping loops, especially when operating under high-noise conditions, which may cause the loops to work against each other instead of being in concert with one another, thereby resulting in increased instability. This may be referred to as loops being coupled. It is referred to as coupled because the behavior of one loop is tied to the behavior of another loop.

Figure 2:
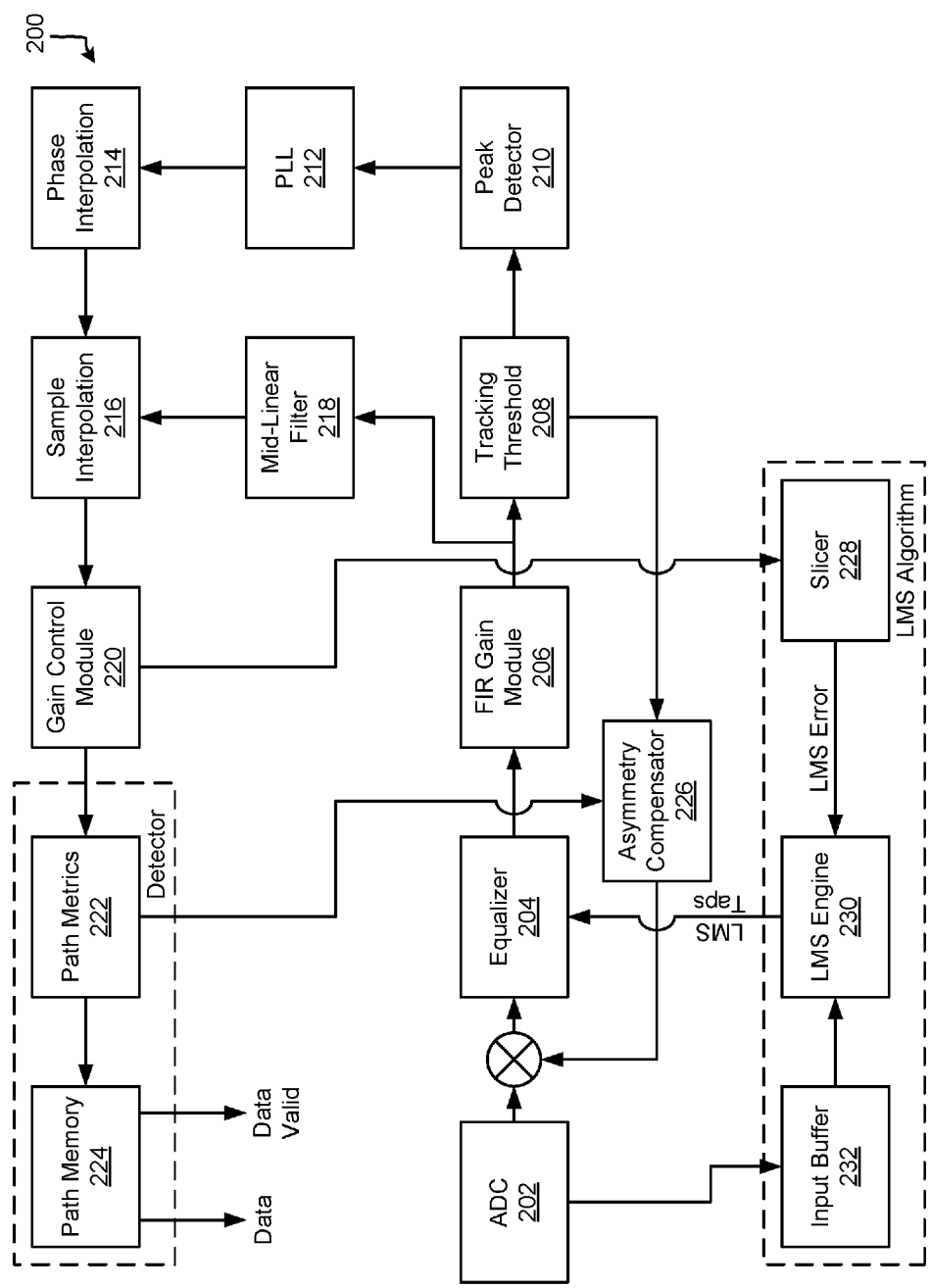
FIG. 2 shows a read-channel having a coupled loop architecture, according to one embodiment.

Coupled loop architectures are commonly used in magnetic tape read channels with adaptive equalizers. In a read-channel 200 having a coupled loop architecture, as shown in FIG. 2, an automatic gain control (AGC) module 220 is coupled with operation of the LMS algorithm in the LMS engine 230. Because of this coupling, many LMS taps of the adaptive equalizer 204, such as an adaptive finite impulse response (FIR) equalizer, are fixed in order to ensure that the adaptive equalizer 204 does not diverge from an operational configuration.

In another configuration, a decoupled loop may be used with a fixed FIR gain. Although the decoupled loop architecture allows for fewer fixed taps, because the gain control module is fixed, the overall performance of the read channel is reduced. In this configuration, gain variations are treated as equalization errors and the FIR filter of the equalizer 204 attempts to adapt to gain errors.

In either of these configurations, the read channel 200 includes an analog-to-digital converter (ADC) 202 which provides data to the equalizer 204, which may employ a filter, such as a FIR filter, which may be controlled by a LMS algorithm executed on an LMS engine 230, a FIR gain module 206, a tracking threshold module 208, a peak detector 210, a phase-locked-loop (PLL) module 212, a phase interpolation module 214, a mid-linear filter 218, a sample interpolation module 216, the automatic gain control module 220, various path metrics 222, path memory 224, an asymmetry compensator 226, a slicer 228, and an input buffer 232.

As can be seen in FIG. 2, the asymmetry compensation loop (which includes outputs from the tracking threshold module 208 and the path metrics 222 while providing an input to the equalizer 204) overlaps with the LMS equalization loop (which includes outputs from the gain control module 220 and the ADC 202 while also providing an input to the equalizer 204).

In one embodiment, the equalizer 204 may utilize a FIR filter, and therefore the terms may be used interchangeably. The FIR filter of the equalizer 204 may have any number of taps such as 9 taps, 11 taps, 22 taps, 21 taps, etc., and in one architecture, the FIR filter of the equalizer 204 may have 17 taps. However, any number of FIR taps may be used, e.g., ranging from 7 FIR taps up to and including 25 FIR taps.

During a read operation in a magnetic tape drive, analog data is received from the magnetic tape (or some buffer positioned between the magnetic tape and the equalizer 204) at an input to the ADC 202. The ADC 202 outputs a digitized form of this analog data. The digital data is then filtered by the equalizer 204 and then processed by numerous other blocks, such as the PLL module 212, the phase interpolation module 214, the mid-linear filter 218, the sample interpolation module 216, the gain control module 220, passed through various path metrics 222, stored in the path memory 224, among other known components of a read-channel architecture not specifically described herein. In addition, the data input from the ADC 202 may be stored in an input buffer 232 of a type known in the art. For the sake of this description, it may be assumed that each of these other components function and behave in accordance with preconceptions and understandings of those of skill in the relevant art.

Ultimately, the binary sequence that was written on the data storage medium, such as a magnetic tape, is decoded and correctly output from the read-channel 200 after passing to the path memory 224.

With this architecture, the input to the asymmetry compensator 226 from the tracking threshold module 208 is only used by the asymmetry compensator 226 in an acquisition mode, e.g., when detecting a data track on a magnetic tape to acquire the actual data signal. this input from the tracking threshold module 208 is not used under any other circumstances. Once the asymmetry compensator 226 has acquired an initial asymmetry estimate, it switches the source of the input from the tracking threshold module 208 to the path metrics 222 so that the feedback path from the tracking threshold module 208 is no longer used.

Figure 3:
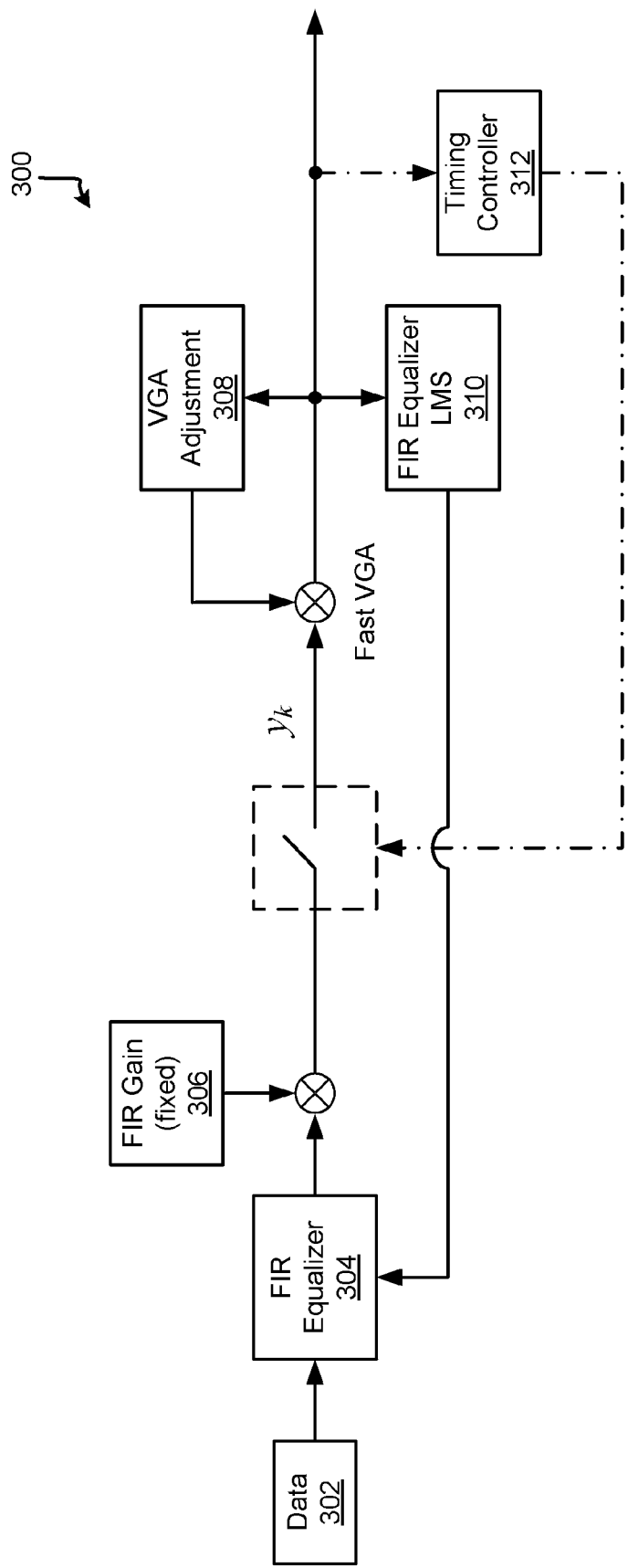
FIG. 3 shows a simplified block diagram of loop coupling in a read channel, according to one embodiment.

Now referring to FIG. 3, a portion of a coupled loop read channel 300 architecture is shown according to one embodiment. As shown, a FIR equalizer 304 receives data 302 read from a data storage medium and an input from a FIR equalizer LMS module 310 taken from the signal after it is gain adjusted. The output of the FIR equalizer 304 is adjusted (multiplied) by a FIR gain value 306, and then adjusted (multiplied) by a variable gain amplifier (VGA) 308 value before being output to other portions of the read channel 300. In some embodiments, a timing controller 312 may be used to adjust the signal timing, which may be based on the signal output from the fast VGA adjustment.

Figure 4:
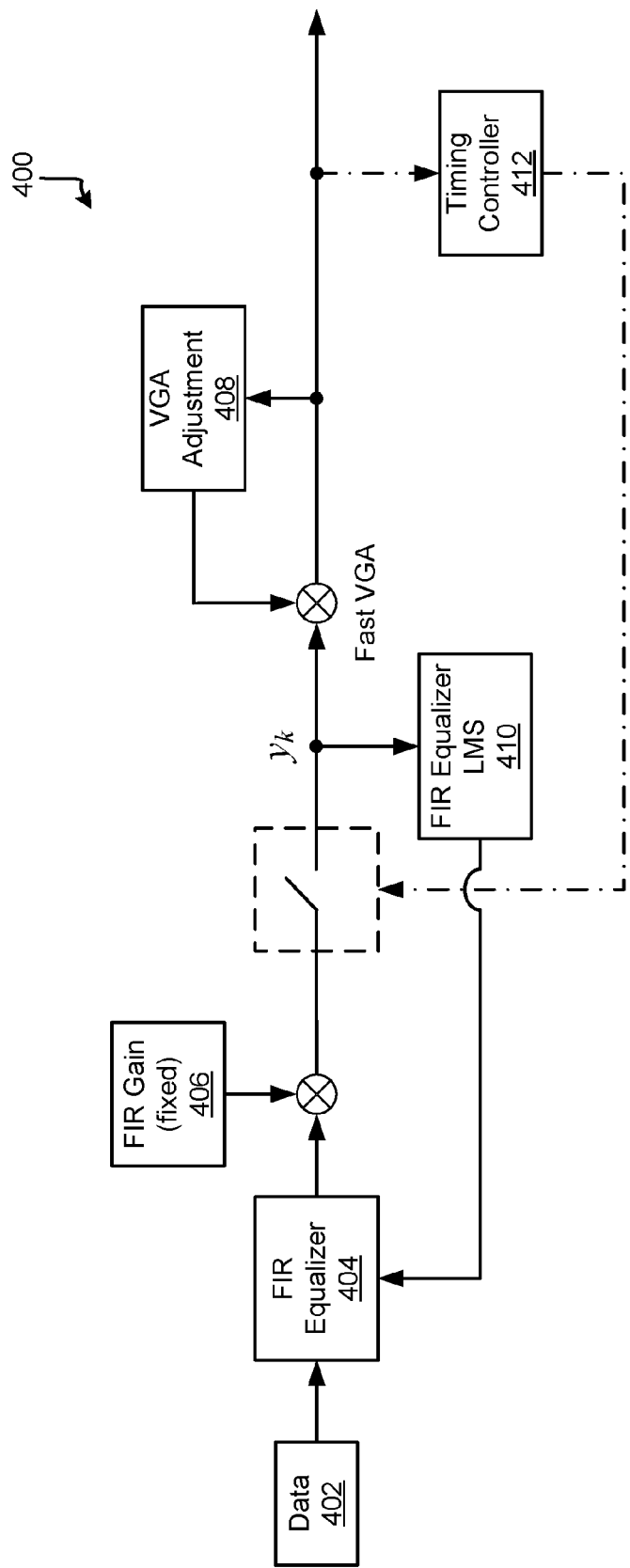
FIG. 4 shows a simplified block diagram of loop decoupling in a read channel, according to one embodiment.

With reference to FIG. 4, a portion of a decoupled loop read channel 400 architecture is shown according to one embodiment. As shown, a FIR equalizer 404 receives data 402 read from a data storage medium and an input from a FIR equalizer LMS module 410 taken from the signal before it is gain adjusted. The output of the FIR equalizer 404 is adjusted (multiplied) by a FIR gain value 406, and then adjusted (multiplied) by a VGA 408 value before being output to other portions of the read channel 400. In some embodiments, a timing controller 412 may be used to adjust the signal timing, which may be based on the signal output from the fast VGA adjustment.

In FIGS. 3-4, FIR coefficients may be limited to a range of [−1,+1], and the FIR gain value ensures proper gain scaling, but is limited to being a fixed value that is programmable through read channel microcode, and therefore is not adaptable.

According to embodiments described herein, an adaptive gain architecture is described that allows the decoupled loop architecture in FIG. 4 to be used without interaction with the automatic gain control module associated with the coupled loop architecture in FIG. 3. Particularly, adaptive gain control is described in various embodiments that is able to function in a decoupled LMS loop architecture. Some advantages of this architecture is that it enables the use of the decoupled LMS loop architecture which is more stable than the coupled loop and requires fewer FIR taps to be fixed. Due to more FIR taps being adaptive, the overall equalizer module is more adaptable.

Tap fixing couples pure gain adjustment together with spectral shaping so that the FIR gain value directly determines the actual amplitude of the fixed FIR taps (with the remaining FIR taps being free to adjust/scale/adapt according to operating conditions). With a coupled loop architecture, the VGA takes care of pure gain adjustment (e.g., VGA provides a "best" or optimum scaling of fixed FIR taps) during the equalizer adaptation process so that LMS adjustments may address only the spectral shaping objective. Therefore, selection of the FIR gain value has much less impact with loop coupling Without fixing FIR taps provided to the LMS algorithm, an average signal-to-noise ratio (SNRa) does not depend on the FIR gain value. Furthermore, adaptive FIR tap coefficients are capable of providing better spectral shaping as well as correct gain in comparison with fixed FIR taps. Also, the equalizer aims at finding a best compromise between spectral shaping and gain (note that phase characteristics are also constrained by fixed FIR taps), and convergence depends on the FIR gain value. Therefore, for some FIR gain values, the equalizer would be unable to achieve acceptable spectral shaping and the FIR gain value would cause a sharp drop of the SNRa. Coefficient saturation is an additional element that constrains adaptation.

Figure 5:
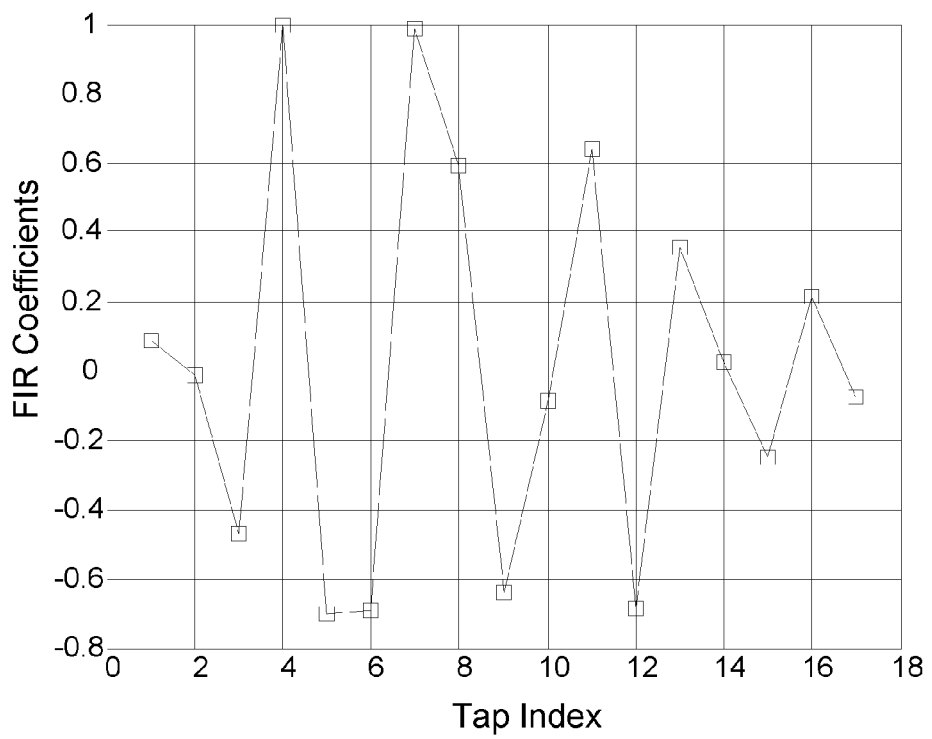
FIG. 5 shows effects of finite impulse response (FIR) gain on average signal-to-noise ratio (SNRa), according to another embodiment.
Figure 5:
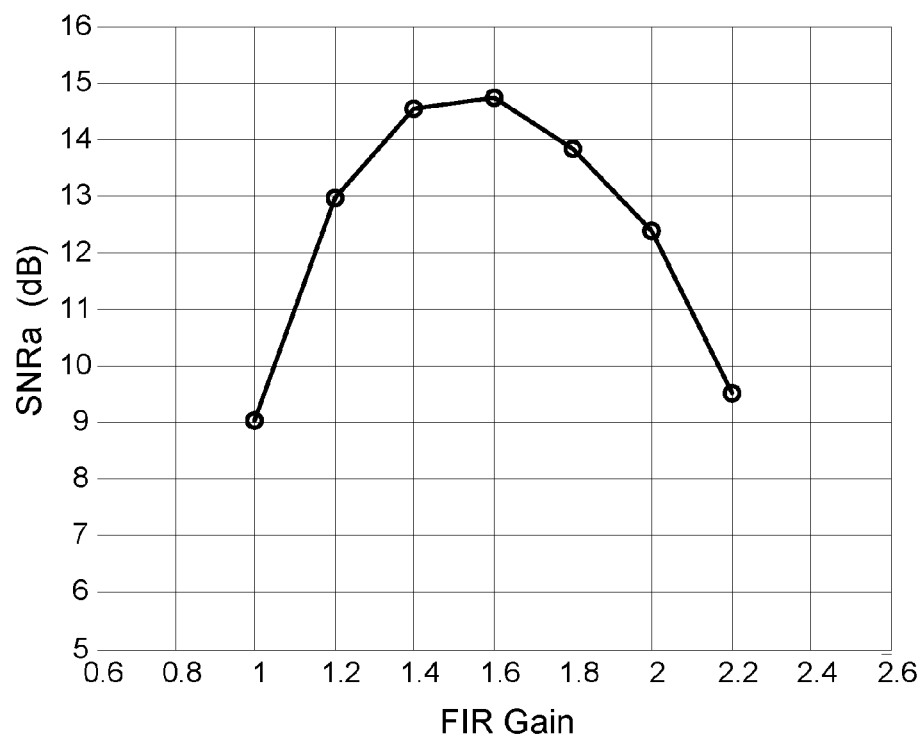

These situations are shown in FIG. 5 with an initial equalizer shown in the top chart in an unstable condition, and an SNRa being directly affected by the FIR gain in a decoupled loop in the bottom chart.

Figure 6:
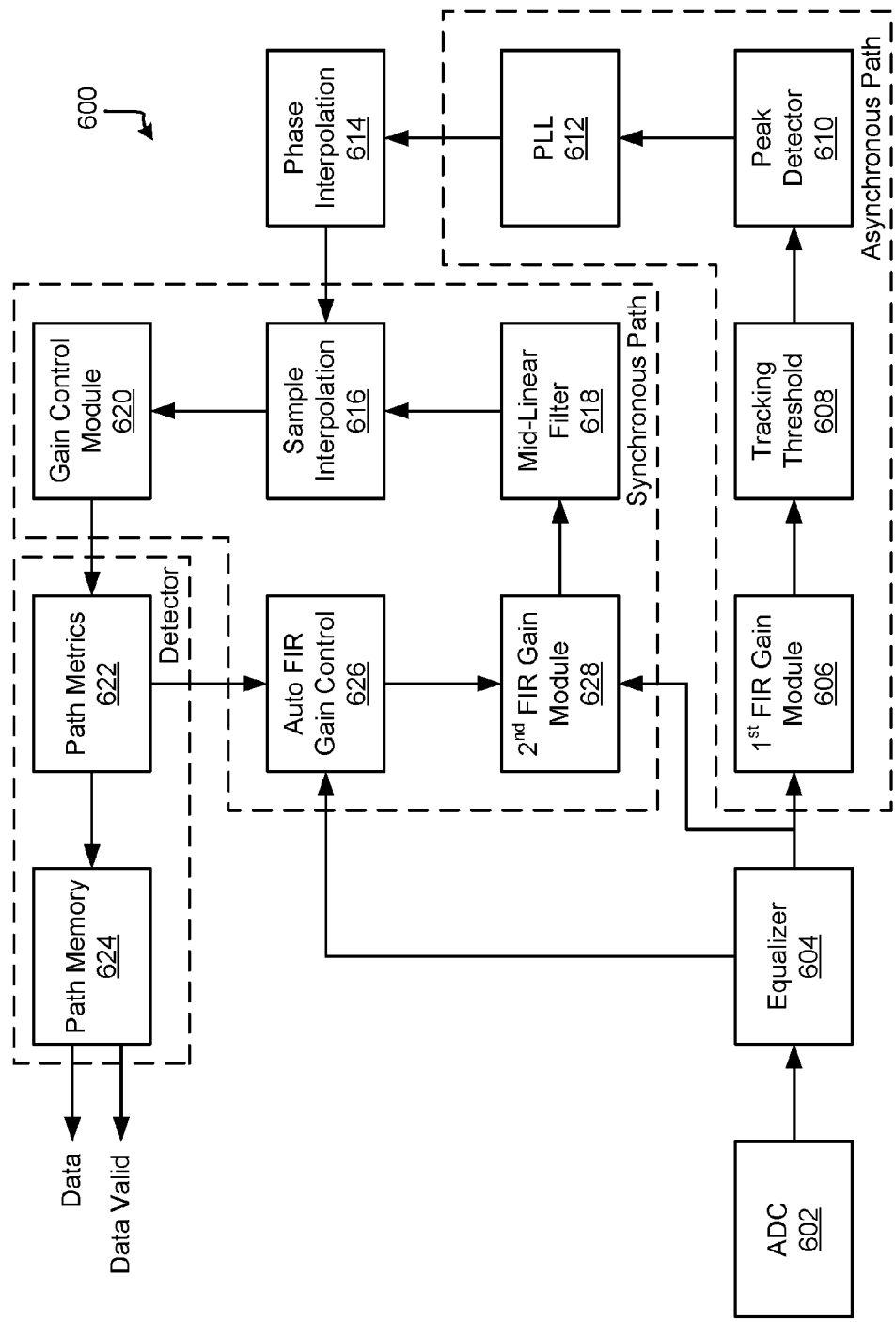
FIG. 6 shows a read-channel, in accordance with one embodiment.

Now referring to FIG. 6, a decoupled read channel 600 architecture which provides adaptive gain control is shown according to one embodiment. The read channel 600 comprises an ADC 602 providing data to an equalizer 604, which may employ a filter such as a FIR filter which may be controlled by an LMS algorithm executed on an LMS engine. Data may pass from the equalizer 604 along an asynchronous path when operating in an acquisition mode. The asynchronous path may include a first FIR gain module 606, a tracking threshold module 608, a peak detector 610, and a PLL module 612. Data may also pass from the equalizer 604 along a synchronous path which includes an automated FIR gain control module 626, a second FIR gain module 628, a mid-linear filter 618, a sample interpolation module 616, and a gain control module 620. The asynchronous path ties back into the synchronous path at the sample interpolation module 616 via a phase interpolation module 614. From the gain control module 620, data is passed through various path metrics 622 to a path memory 624, which produces data and validity information.

The automated FIR gain control module 626, in various embodiments, may receive a gain error signal from the path metrics 622 and/or a FIR output from the equalizer 604. In current read channel architectures which lack automated FIR gain control and instead rely on fixed FIR gain, an estimate of the desired FIR gain is calculated based on calibration measurements and then the FIR gain is set in microcode. Once set in this fashion, the FIR gain is not capable of being changed while the data is being read. Thus, any variations in the gain are not able to be tracked.

With a decoupled loop architecture as shown in FIG. 4, the LMS loop attempts to compensate for any gain errors in the FIR equalizer 404. This degrades the performance of the entire read channel 400. Thus, the decoupled LMS loop architecture is unusable in a product environment.

With the addition of the automated FIR gain control module 626 to a decoupled loop architecture as shown in FIG. 6, variations in the amplitude of the signal are able to be tracked. This enables the decoupled LMS loop to operate over a wide range of environmental and operating conditions and increase the adaptability of the LMS loop architecture.

Figure 7:
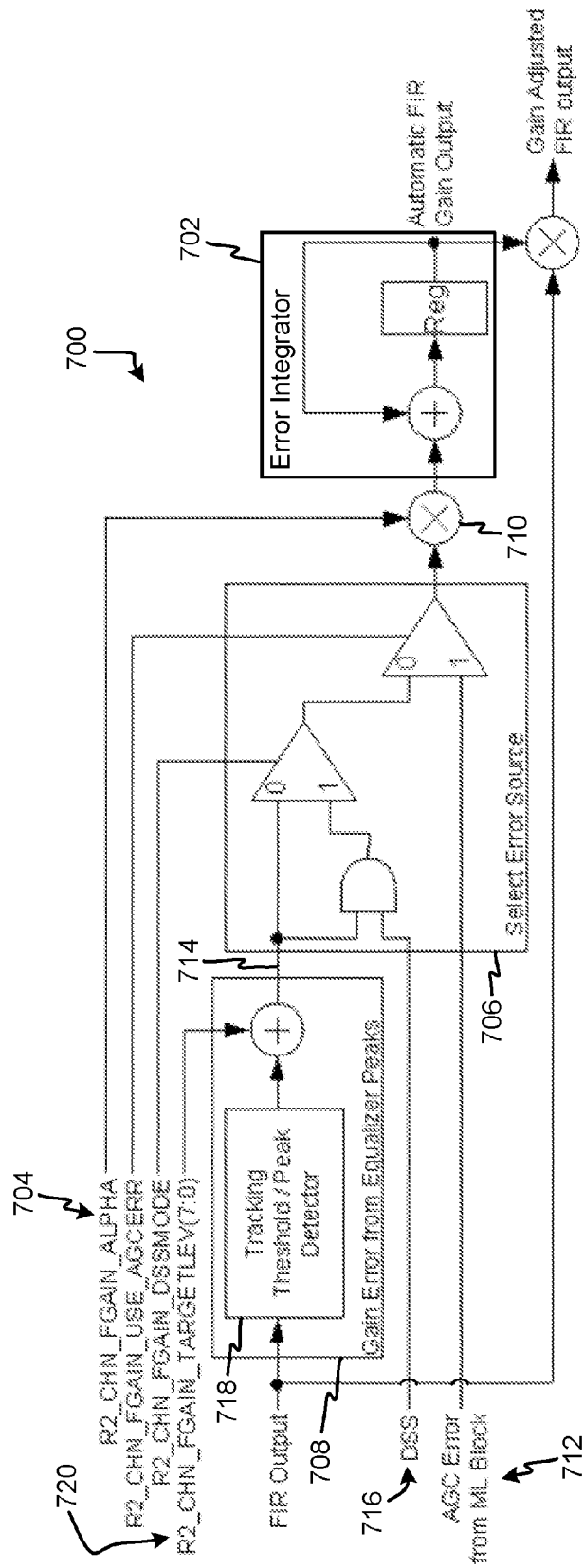
FIG. 7 shows a more detailed block diagram of an automated FIR gain control module, in one embodiment.

Now referring to FIG. 7, a block diagram of an automated FIR gain control module 700 is shown according to one embodiment. As shown, the automated FIR gain control module 700 comprises many components/elements, some of which aid in the adaptability including: an error integrator 702, a loop gain parameter (alpha) 704, an error source selection module 706, and an asynchronous error generation module 708.

The error integrator 702 is positioned at an output of the error source selection module 706 and includes the register and adder. The error integrator 702 is configured to charge up or charge down relative to a received error signal from the error source selection module 706, according to one embodiment.

The loop gain parameter 704 (denoted as alpha) is multiplied by the received error signal from the error source selection module 706, according to one embodiment, at a multiplier block 710 positioned at an output of the error source selection module 706 and at an input to the error integrator 702. The loop gain parameter 704 is configured to control the charge or decay time of the error integrator 702. With a small alpha value, the loop response is slow. In contrast, with a large alpha value, the loop response is fast.

The error source selection module 706 is configured to choose which source of error is used in the loop calculations. There are three possible error sources for the automated FIR gain control module 700 to utilize: AGC error 712 from a detector, such as a maximum likelihood (ML) module, gain error 714 from the tracking threshold module 718 when operating in asynchronous mode, and different gain error 714 from the tracking threshold module 718 that is provided only when data set separator (DSS) patterns 716 are available.

A DSS pattern is positioned between each data set on the magnetic medium indicating a next data set. While reading the DSS pattern, the LMS equalization loop is inactive. However, the source of the gain error from the tracking threshold module is still contained within the LMS equalization loop. Therefore, there is still a possibility of loop interaction.

The AGC error 712 from the ML engine is a very accurate estimate of the gain error. Unfortunately, it crosses several loop boundaries (specifically the timing loop, and the fast AGC loop) and there may be loop interaction associated with its use in the automated FIR gain control module 700. This is considered a synchronous source of error since it occurs after the input signal has been re-sampled by the timing loop.

The gain error 714 from the tracking threshold module in asynchronous mode is based on measuring peak amplitude of the waveform, where the peaks are qualified with a tracking threshold signal. This is considered an asynchronous source since it has not been re-sampled by the timing loop yet. One advantage to this approach is that no loop boundaries are crossed, but the error estimate is not as accurate as the AGC error 712. A potential weakness to this approach is that this loop is contained entirely within the LMS loop and therefore, loop interaction may occur.

The gain error 714 during DSS patterns 716 or sequences of the magnetic medium is based on measuring the peak amplitude of the waveform where the peaks are qualified with a tracking threshold signal. In this case, the only time the peaks are measured is when the head is positioned over the DSS pattern. This is a period of time where the LMS loop is not active. Thus, there should be no loop interaction between the FIR gain loop and the LMS loop.

The asynchronous error generation module 708 generates errors based upon waveform peaks. This asynchronous error generation module 708 uses a tracking threshold module 718 to generate peak samples that are greater in magnitude than a measured threshold. The tracking threshold module 718 is fully programmable in some embodiments. The qualified peaks are compared to a programmable target level 720 and an error 714 is generated from this comparison.

Figure 8A:
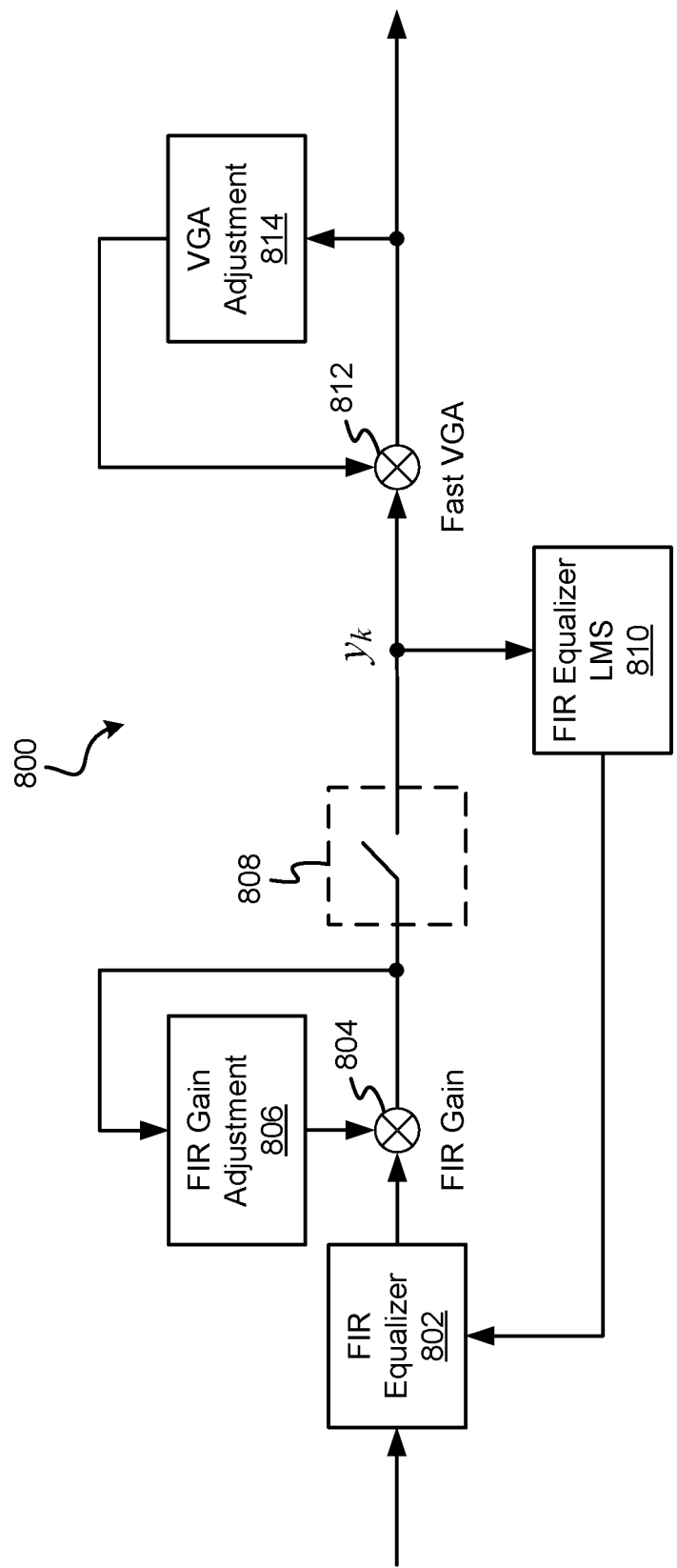
FIG. 8A shows a system configured for automatic determination of FIR gain in one embodiment.
Figure 8B:
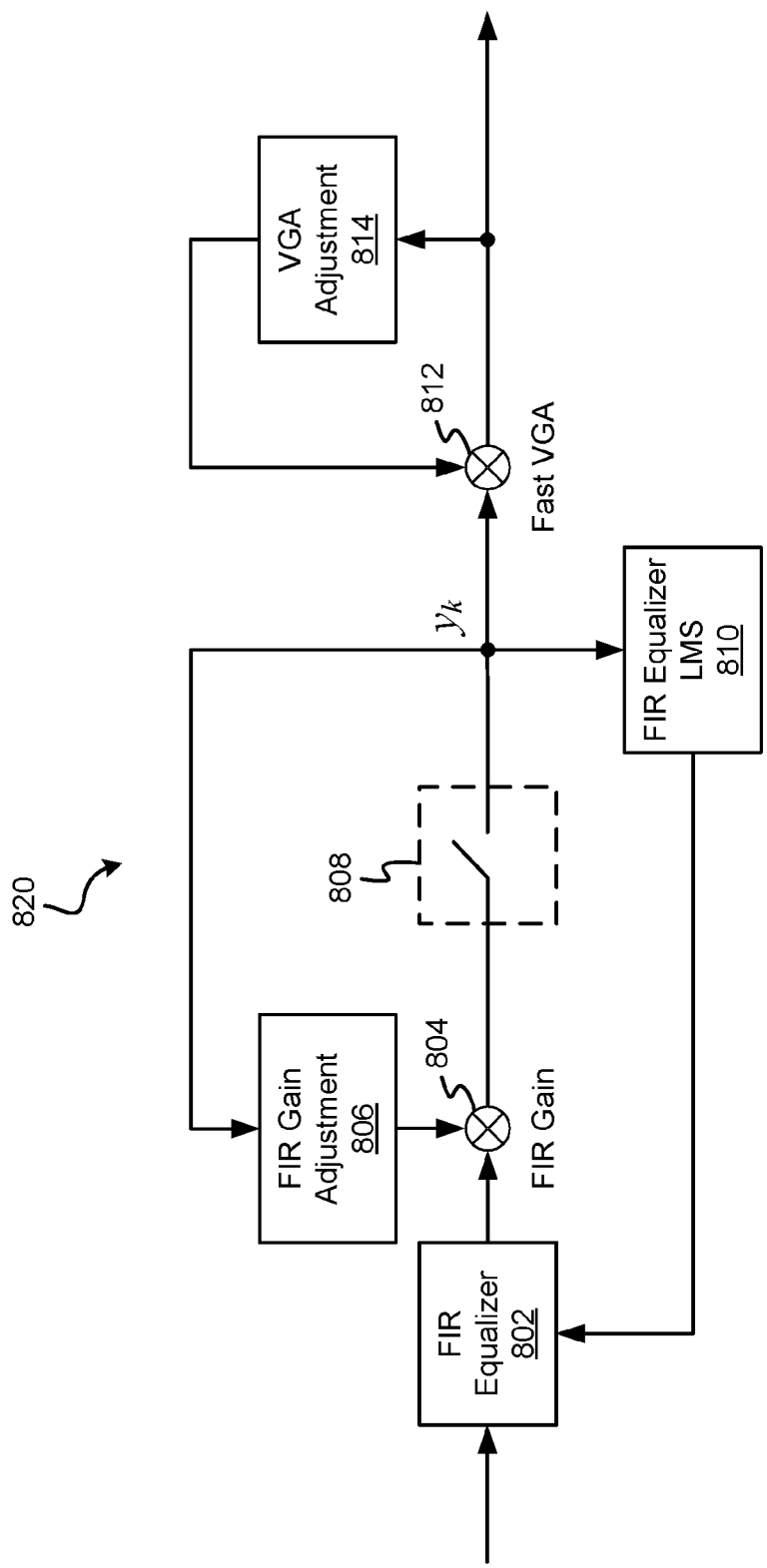
FIG. 8B shows a system configured for automatic determination of FIR gain in another embodiment.

System configured for automatic determination of FIR gain are shown in FIGS. 8A-8B according to several embodiments. In FIG. 8A, a system 800 is shown comprising a FIR equalizer 802, a FIR gain implementation module 804 positioned at an output of the FIR equalizer 802, a FIR gain adjustment module 806 which operates on a feedback loop from an output of the FIR gain implementation module 804 and provides the FIR gain value to the FIR gain implementation module 804, a timing switch 808, a FIR equalizer LMS module 810 which provides FIR taps to the FIR equalizer 802 positioned downstream of the timing switch 808, a fast VGA implementation module 812 positioned downstream of a sampling point for the FIR equalizer LMS module 810, and a VGA adjustment module 814 which operates on a feedback loop from an output of the fast VGA implementation module 812 and provides the VGA value to the fast VGA implementation module 812.

In FIG. 8B, a system 820 is shown comprising a FIR equalizer 802, a FIR gain implementation module 804 positioned at an output of the FIR equalizer 802, a timing switch 808 positioned at an output of the FIR gain implementation module 804, a FIR gain adjustment module 806 and a FIR equalizer LMS module 810 positioned downstream of the timing switch 808, a fast VGA implementation module 812 positioned downstream of the timing switch 808 and branch for sampling to the FIR gain adjustment module 806 and the FIR equalizer LMS module 810, and a VGA adjustment module 814 which operates on a feedback loop from an output of the fast VGA implementation module 812 and provides the VGA value to the fast VGA implementation module 812.

The FIR gain adjustment module 806 operates on a feedback loop from an output of the FIR gain implementation module 804 beyond the timing switch 808 and provides the FIR gain value to the FIR gain implementation module 804, while the FIR equalizer LMS module 810 provides FIR taps to the FIR equalizer 802 from a sampling point positioned downstream of the timing switch 808.

In systems 800, 820 shown in FIGS. 8A-8B, respectively, initial FIR taps are set prior to processing data along with an initial FIR gain value (such as 1, 1.1, 0.9, etc.). Then, the FIR gain adjustment module 806 processes data until convergence is reached, at which point the LMS algorithm may be executed in the FIR equalizer LMS module 810. Thereafter, the FIR gain value is adjusted periodically or as needed to ensure that the data signal is always correctly scaled in power while the LMS algorithm is adjusting to compensate for current operating conditions. The FIR gain value may then be frozen (set) after the FIR equalizer LMS module 810 attains convergence or a fixed number of iterations have been executed without convergence being reached.

In one embodiment, the FIR gain value may be calculated based on Formula 1 below:

$$\text{FIRgain}_k = \text{FIRgain}_{k-1} - \alpha(\text{Pwr}_k - \text{TrgtPwr}) \quad \text{Formula 1}$$

In Formula 1, $\text{FIRgain}_k$ is the FIR gain value at sample k, $\text{FIRgain}_{k-1}$ is the FIR gain value for the previous sample k−1, α is a FIR loop gain parameter, $\text{Pwr}_k$ is the power in the data at sample k, and TrgtPwr is the target power level.

In one embodiment, $\text{Pwr}_k$ may be calculated using Formula 2, below:

$$\text{Pwr}_k = (1-\epsilon)\text{Pwr}_{k-1} + \epsilon y_k^2 \quad \text{Formula 2}$$

In Formula 2, $\text{Pwr}_k$ is the power in the data at sample k, $\text{Pwr}_{k-1}$ is the previous power at sample k−1, $y_k$ is the data signal at the output of the equalizer at sample k, and ε is the loop feedback gain. These values and parameters are all provided to the automated FIR gain control module, as indicated in FIGS. 6, 7, 8A, and 8B.

Figure 9:
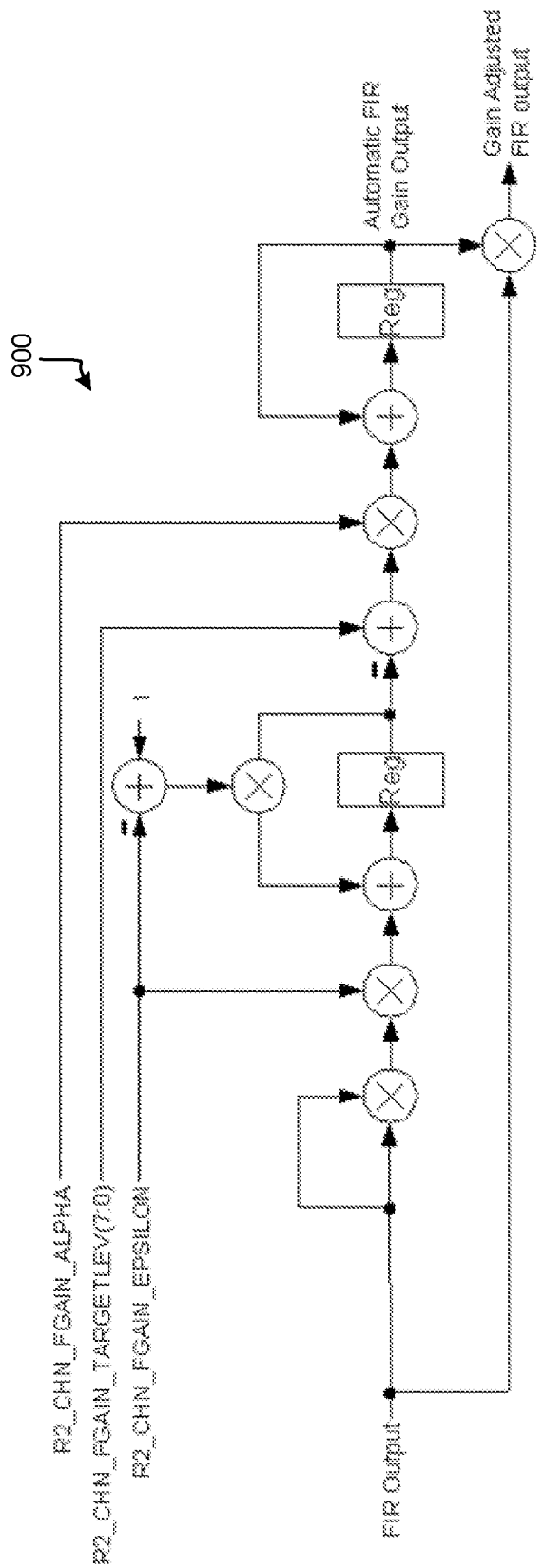
FIG. 9 shows a more detailed block diagram of an automated FIR gain control module, in another embodiment.

Now referring to FIG. 9, a block diagram of a system 900 that is configured to provide automated FIR gain control is shown according to one embodiment. As shown, the system 900 includes many of the same inputs and outputs as the automated FIR gain control module 700 of FIG. 7. However, as shown in FIG. 9, the system 900 utilizes simple mathematical operations to accomplish automated gain control based on the FIR equalizer output, FIR loop gain parameter (alpha), target power level, and FIR gain error.

Figure 10:
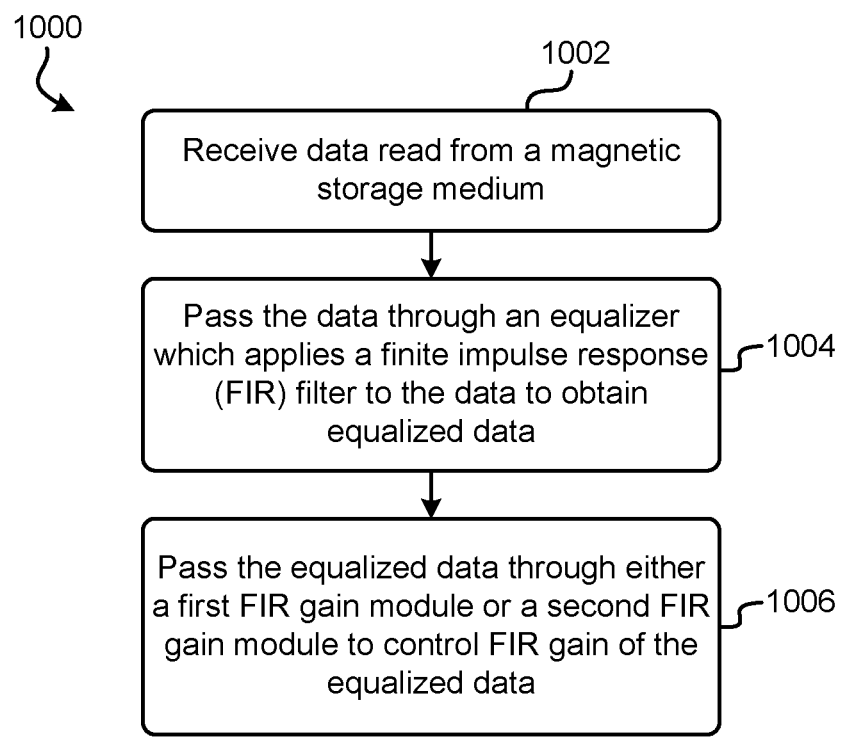
FIG. 10 is a flowchart of a method according to one embodiment.

Now referring to FIG. 10, a flowchart of a method 1000 for processing data in a read channel is shown according to one embodiment. The method 1000 may be performed in accordance with the present invention in any of the environments depicted in FIGS. 1A-9, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a magnetic tape drive or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 may initiate with operation 1002, where data read from a magnetic storage medium is received. In one embodiment, the magnetic storage medium may be magnetic tape having a plurality of data sets stored thereon.

In various other embodiments, the magnetic storage medium may be a magnetic tape, an optical disk, a hard disk, etc. Certain aspects of the method 1000 may change depending on what type of magnetic storage medium is being read and having data thereof processed, but the overall scheme should translate across many different media platforms.

In operation 1004, the data is passed through an equalizer which applies a FIR filter to the data to obtain equalized data. Any method of applying the FIR filter may be used as known in the art and/or described herein.

In operation 1006, the equalized data is passed through either a first FIR gain module or a second FIR gain module to control gain of the equalized data. The first FIR gain module is utilized when reading data in an asynchronous mode (e.g., in an acquisition mode when a magnetic reader is positioned above a DSS or some other indicator of spacing between data sets). The second FIR gain module is utilized when reading data in a synchronous mode and a FIR gain value of the second FIR gain module is automatically controlled.

In a further embodiment, method 1000 may include automatically controlling a FIR gain value in the second FIR gain module using an automated FIR gain control module based on a FIR output from the equalizer and variations in an amplitude of a waveform of the data. In this way, the FIR gain value may be automatically provided to adjust the FIR output from the equalizer, and thereby account for variations in the amplitude of the waveform of the equalized data.

In another embodiment, in order to provide automated FIR gain control, method 1000 may include, using the automated FIR gain control module, receiving the FIR output from the equalizer, selecting at least one error source from a plurality of error sources available to the automated FIR gain control module, calculating a FIR gain value based on error provided by the at least one selected error source, and calculating a gain adjusted FIR output based on the FIR gain value and the FIR output from the equalizer.

In one embodiment, the plurality of error sources may comprise: error derived from a tracking threshold module and/or a peak detector from observations during data reads, error derived from observations during data set separator (DSS) reads, and AGC error from a ML module. Other sources of error may be used, along with gain error feedback which may also be included in the automatic FIR gain output to gain-adjust the FIR output of the equalizer.

In yet another further embodiment, method 1000 may include, when in the synchronous mode (e.g., while reading data from the magnetic storage medium): receiving the data (such as from an ADC), passing the equalized data from the equalizer through a mid-linear filter to obtain linear data, passing the linear data from an output of the mid-linear filter through a sample interpolation module to obtain interpolated data, passing the interpolated data from an output of the sample interpolation module through a gain control module to obtain gain adjusted data, and outputting the gain adjusted data. Any of these operations may be performed as would be understood by one of skill in the art, and possibly using modules/blocks/processors capable of such functionality that are known in the art.

In another further embodiment, method 1000 may include, when in the asynchronous mode (e.g., while in acquisition mode and reading a DSS): receiving the data (such as from an ADC), passing the equalized data from the equalizer through a tracking threshold module when reading a DSS from the magnetic storage medium to determine tracking of the magnetic data storage medium during the data reading, passing the equalized data from an output of the tracking threshold module through a peak detector to detect peaks in a waveform of the data, passing the equalized data from an output of the peak detector through a PLL module to obtain synchronous sampled data, passing the synchronous sampled data through a phase interpolation module to obtain timing information, passing the synchronous sampled data through a sample interpolation module to obtain interpolated data, passing the interpolated data through a gain control module to obtain gain adjusted data, and outputting the gain adjusted data. Any of these operations may be performed as would be understood by one of skill in the art, and possibly using modules/blocks/processors capable of such functionality that are known in the art.

Method 1000 may be executed by a system, such as a tape drive, a computer program product, or some other suitable device. Any such system or device may include a processor and logic (hardware and/or software logic) integrated with the processor and/or executable or readable by the processor, thereby allowing for a system and/or device that may utilize any combination of hardware and software logic designed for fast response, ease of adjustment, or some other goal of the system and/or device arrangement.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic tape drive, comprising a controller configured to:
   direct data through either a first finite impulse response (FIR) gain module or a second FIR gain module to control FIR gain of the data,
   wherein the first FIR gain module is utilized when reading data from a magnetic tape medium in an asynchronous mode, and
   wherein the second FIR gain module is utilized when reading data from the magnetic tape medium in a synchronous mode and a FIR gain value of the second FIR gain module is automatically controlled.

2. The magnetic tape drive as recited in claim 1, wherein the controller is further configured to:
   read data from the magnetic tape medium using at least one magnetic head; and
   apply a FIR filter to the data using an equalizer to obtain equalized data.

3. The magnetic tape drive as recited in claim 2, wherein the controller is further configured to automatically control the FIR gain value in the second FIR gain module using an automated FIR gain control module based on a FIR output from the equalizer and variations in an amplitude of a waveform of the data.

4. The magnetic tape drive as recited in claim 3, wherein the automated FIR gain control module comprises logic configured to:
   receive the FIR output from the equalizer;
   select at least one error source from a plurality of error sources available to the automated FIR gain control module;
   calculate the FIR gain value based on error provided by the at least one selected error source; and
   calculate a gain adjusted FIR output based on the FIR gain value and the FIR output from the equalizer.

5. The magnetic tape drive as recited in claim 4, wherein the plurality of error sources comprise:
   error derived from a tracking threshold module and/or a peak detector from observations during data reads;
   error derived from observations during data set separator (DSS) reads; and
   automatic gain control (AGC) error from a maximum likelihood (ML) module.

6. The magnetic tape drive as recited in claim 2, wherein the controller is further configured, when in the synchronous mode, to:
   provide the data to the equalizer from an analog-to-digital converter (ADC);
   pass the equalized data from the equalizer through a mid-linear filter to obtain linear data;
   pass the linear data from an output of the mid-linear filter through a sample interpolation module to obtain interpolated data;
   pass the interpolated data from an output of the sample interpolation module through a gain control module to obtain gain adjusted data; and
   output the gain adjusted data.

7. The magnetic tape drive as recited in claim 2, wherein the controller is further configured, when in the asynchronous mode, to:
   provide the data to the equalizer from an analog-to-digital converter (ADC);
   pass the equalized data from the equalizer through a tracking threshold module when reading a data set separator (DSS) from the magnetic tape medium to determine tracking of the magnetic tape medium during the data reading;
   pass the equalized data from an output of the tracking threshold module through a peak detector to detect peaks in a waveform of the data;
   pass the equalized data from an output of the peak detector through a phase-locked-loop (PLL) module to obtain synchronous sampled data;
   pass the synchronous sampled data through a phase interpolation module to obtain timing information;
   pass the synchronous sampled data through a sample interpolation module to obtain interpolated data;
   pass the interpolated data through a gain control module to obtain gain adjusted data; and
   output the gain adjusted data.

8. A magnetic tape drive, comprising a controller configured to:
   direct first data through a first finite impulse response (FIR) gain module in response to a determination that the first data is being read from a magnetic tape medium in an asynchronous mode to control FIR gain of the first data; and
   direct second data through a second FIR gain module in response to a determination that the second data is being read from the magnetic tape medium in a synchronous mode to control FIR gain of the second data, wherein a FIR gain value of the second FIR gain module is automatically controlled.

9. The magnetic tape drive as recited in claim 8, wherein the controller is further configured to:
   read the first and second data from the magnetic tape medium using at least one magnetic head; and
   apply a FIR filter to the first and second data using an equalizer to obtain first and second equalized data.

10. The magnetic tape drive as recited in claim 9, wherein the controller is further configured to automatically control the FIR gain value in the second FIR gain module using an automated FIR gain control module based on a FIR output from the equalizer and variations in an amplitude of a waveform of the second data.

11. The magnetic tape drive as recited in claim 10, wherein the automated FIR gain control module comprises logic configured to:
   receive the FIR output from the equalizer;
   select at least one error source from a plurality of error sources available to the automated FIR gain control module;
   calculate the FIR gain value based on error provided by the at least one selected error source; and
   calculate a gain adjusted FIR output based on the FIR gain value and the FIR output from the equalizer.

12. The magnetic tape drive as recited in claim 11, wherein the plurality of error sources comprise:
   error derived from a tracking threshold module and/or a peak detector from observations during data reads;
   error derived from observations during data set separator (DSS) reads; and
   automatic gain control (AGC) error from a maximum likelihood (ML) module.

13. The magnetic tape drive as recited in claim 9, wherein the controller is further configured, when in the synchronous mode, to:
   provide the second data to the equalizer from an analog-to-digital converter (ADC);
   pass the second equalized data from the equalizer through a mid-linear filter to obtain linear data;
   pass the linear data from an output of the mid-linear filter through a sample interpolation module to obtain interpolated data;
   pass the interpolated data from an output of the sample interpolation module through a gain control module to obtain gain adjusted data; and
   output the gain adjusted data.

14. The magnetic tape drive as recited in claim 9, wherein the controller is further configured, when in the asynchronous mode, to:
   provide the first data to the equalizer from an analog-to-digital converter (ADC);

pass the first equalized data from the equalizer through a tracking threshold module when reading a data set separator (DSS) from the magnetic tape medium to determine tracking of the magnetic tape medium during the data reading;

pass the first equalized data from an output of the tracking threshold module through a peak detector to detect peaks in a waveform of the first equalized data;

pass the first equalized data from an output of the peak detector through a phase-locked-loop (PLL) module to obtain synchronous sampled data;

pass the synchronous sampled data through a phase interpolation module to obtain timing information;

pass the synchronous sampled data through a sample interpolation module to obtain interpolated data;

pass the interpolated data through a gain control module to obtain gain adjusted data; and output the gain adjusted data.

15. A magnetic tape drive, comprising a controller configured to:

direct data through either a first finite impulse response (FIR) gain module or a second FIR gain module to control FIR gain of the data depending on a mode used to read the data from a magnetic tape medium, wherein the first FIR gain module is utilized when reading the data from the magnetic tape medium in an asynchronous mode, and wherein the second FIR gain module is utilized when reading the data from the magnetic tape medium in a synchronous mode.

16. The magnetic tape drive as recited in claim 15, wherein the controller is further configured to automatically control a FIR gain value in the second FIR gain module using an automated FIR gain control module based on a FIR output from an equalizer and variations in an amplitude of a waveform of the data.

17. The magnetic tape drive as recited in claim 16, wherein the automated FIR gain control module comprises logic configured to:

receive the FIR output from the equalizer;

select at least one error source from a plurality of error sources available to the automated FIR gain control module;

calculate the FIR gain value based on error provided by the at least one selected error source; and calculate a gain adjusted FIR output based on the FIR gain value and the FIR output from the equalizer.

18. The magnetic tape drive as recited in claim 17, wherein the plurality of error sources comprise:

error derived from a tracking threshold module and/or a peak detector from observations during data reads;

error derived from observations during data set separator (DSS) reads; and automatic gain control (AGC) error from a maximum likelihood (ML) module.

19. The magnetic tape drive as recited in claim 15, wherein the controller is further configured, when in the synchronous mode, to:

provide the data to an equalizer from an analog-to-digital converter (ADC);

apply a FIR filter to the data at the equalizer to obtain equalized data;

linearize the equalized data from the equalizer using a mid-linear filter to obtain linear data;

interpolate the linear data using a sample interpolation module to obtain interpolated data;

adjust a gain of the interpolated data using a gain control module to obtain gain adjusted data; and output the gain adjusted data.

20. The magnetic tape drive as recited in claim 15, wherein the controller is further configured, when in the asynchronous mode, to:

provide the data to an equalizer from an analog-to-digital converter (ADC);

apply a FIR filter to the data using the equalizer to obtain equalized data;

determine tracking of the magnetic tape medium during data reading using a tracking threshold module when reading a data set separator (DSS);

detect peaks in a waveform of the equalized data using a peak detector;

obtain synchronous sampled data from the equalized data frusing a phase-locked-loop (PLL) module;

determine timing information for the synchronous sampled data using a phase interpolation module;

determine interpolated data from the synchronous sampled data using a sample interpolation module;

adjust a gain of the interpolated data using a gain control module to obtain gain adjusted data; and output the gain adjusted data.

\* \* \* \* \*